(12) United States Patent
Hori

(10) Patent No.: US 10,897,546 B2
(45) Date of Patent: Jan. 19, 2021

(54) PRINT SYSTEM SYSTEM FOR DISPLAYING A PREVIEW FOR A JOB CONTAINING A PLURALITY OF DIFFERENT ROLL MEDIA

(71) Applicant: CANON KABUSHIKI KAISHA, Tokyo (JP)

(72) Inventor: Daisuke Hori, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/185,326

(22) Filed: Nov. 9, 2018

(65) Prior Publication Data

US 2019/0149676 A1    May 16, 2019

(30) Foreign Application Priority Data

Nov. 16, 2017   (JP) ................................ 2017-221023

(51) Int. Cl.
*H04N 1/00*        (2006.01)
(52) U.S. Cl.
CPC ..... *H04N 1/00456* (2013.01); *H04N 1/00649* (2013.01); *H04N 1/00665* (2013.01)
(58) Field of Classification Search
CPC .......................... H04N 1/00456; H04N 1/0044
See application file for complete search history.

(56) References Cited

U.S. PATENT DOCUMENTS

| | | | |
|---|---|---|---|
| 9,349,079 B2 | 5/2016 | Hori | |
| 2013/0045851 A1* | 2/2013 | Hori | G06F 3/1204 493/405 |
| 2014/0085665 A1* | 3/2014 | Sheldon | G06F 3/1205 358/1.15 |
| 2015/0212771 A1* | 7/2015 | Hori | G06F 3/1242 358/1.18 |
| 2017/0277492 A1* | 9/2017 | Van Rossum | G06F 3/1205 |
| 2018/0146115 A1* | 5/2018 | Thompson | H04N 1/0044 |

FOREIGN PATENT DOCUMENTS

| | | | |
|---|---|---|---|
| JP | 2010-198497 A | 9/2010 | |
| JP | 2014-198497 A | 9/2010 | |

\* cited by examiner

*Primary Examiner* — Benjamin O Dulaney
(74) *Attorney, Agent, or Firm* — Venable LLP

(57) ABSTRACT

A print preview of each page is correctly displayed even in the case of a print job including a plurality of pages requiring different sizes and types of print medium. For this purpose, print medium information about a print medium fed from each of a plurality of feeding units provided in a printing apparatus is acquired and, based on this information and setting information set for each of a plurality of pages included in a print job, each of the pages is allocated to a print medium fed from any one of the feeding units. After that, a preview in which a page allocated to a first print medium fed from a first feeding unit is laid out on an image representing the first print medium and a preview in which a page allocated to a second print medium fed from a second feeding unit is laid out on an image representing the second print medium are displayed.

15 Claims, 16 Drawing Sheets

PRINT SYSTEM SYSTEM FOR DISPLAYING A PREVIEW FOR A JOB CONTAINING A PLURALITY OF DIFFERENT ROLL MEDIA

BACKGROUND OF THE INVENTION

Field of the Invention

The present invention relates to a print control method for providing a print preview and a print control apparatus and a print system for performing the print control method.

Description of the Related Art

Japanese Patent Laid-Open No. 2010-198497 discloses a print preview technique for allowing a printer driver to acquire information about a print medium placed in a printing apparatus and display how an image to be printed is laid out and printed on the print medium.

SUMMARY OF THE INVENTION

In Japanese Patent Laid-Open No. 2010-198497, consideration is not given for a print preview in the case where one print job includes a plurality of pages requiring different sizes and types of print medium. For this reason, for instance, in the case of such a job that the size and type of print medium used for printing are different for each page, a user cannot correctly confirm the layout of each page and there is a possibility that an image is printed on an unintended print medium.

The present invention has been accomplished in order to solve the above problem. Accordingly, an object of the present invention is to display a print preview of each page correctly even in the case of a print job including a plurality of pages requiring different sizes or types of print medium. In particular, the present invention aims to display a print preview more appropriately in the case of using a plurality of print medium fed from a plurality of sheet feeding openings.

According to a first aspect of the present invention, there is provided a control method of a control apparatus, that can communicate with a printing apparatus equipped with a plurality of feeding units including a first feeding unit and a second feeding unit each configured to feed a continuous print medium, the control method comprising: acquiring print medium information about a print medium fed from each of the feeding units provided in the printing apparatus; allocating, based on the acquired print medium information and setting information set for each of a plurality of pages included in a print job, each of the pages to a print medium fed from any one of the feeding units among the plurality of the feeding units; and displaying a preview in which a page allocated to a first print medium fed from the first feeding unit is laid out on an image representing the first print medium and a preview in which a page allocated to a second print medium fed from the second feeding unit is laid out on an image representing the second print medium.

According to a second aspect of the present invention, there is provided a control apparatus that can communicate with a printing apparatus equipped with a plurality of feeding units including a first feeding unit and a second feeding unit each configured to feed a continuous print medium, the control apparatus comprising: an acquisition unit configured to acquire print medium information about a print medium fed from each of the feeding units provided in the printing apparatus; an allocation unit configured to allocate, based on the acquired print medium information and setting information set for each of a plurality of pages included in a print job, each of the pages to a print medium fed from any one of the feeding units; a preview unit configured to display a preview in which a page allocated to a first print medium fed from the first feeding unit is laid out on an image representing the first print medium and a preview in which a page allocated to a second print medium fed from the second feeding unit is laid out on an image representing the second print medium; and a generation unit configured to generate, based on a result of the allocation, print data processible by the printing apparatus.

According to a third aspect of the present invention, there is provided a print system including a printing apparatus and a control apparatus, the printing apparatus being equipped with a plurality of feeding units including a first feeding unit and a second feeding unit each configured to feed a continuous print medium, the control apparatus being configured to communicate with the printing apparatus, the print system comprising: an acquisition unit configured to acquire print medium information about a print medium fed from each of the feeding units provided in the printing apparatus; an allocation unit configured to allocate, based on the acquired print medium information and setting information set for each of a plurality of pages included in a print job, each of the pages to a print medium fed from any one of the feeding units among the plurality of the feeding units; a preview unit configured to display a preview in which a page allocated to a first print medium fed from the first feeding unit is laid out on an image representing the first print medium and a preview in which a page allocated to a second print medium fed from the second feeding unit is laid out on an image representing the second print medium; a generation unit configured to generate print data based on a result of the allocation and in accordance with the print job; and a printing unit configured to perform printing based on the print data.

Further features of the present invention will become apparent from the following description of exemplary embodiments with reference to the attached drawings.

BRIEF DESCRIPTION OF THE DRAWINGS

FIG. 12 is a diagram showing the relationship of FIGS. 12A and 12B;

DESCRIPTION OF THE EMBODIMENTS

Preferred embodiments of the present invention will be described below in detail with reference to the accompanying drawings.

First Embodiment

Figure 1:
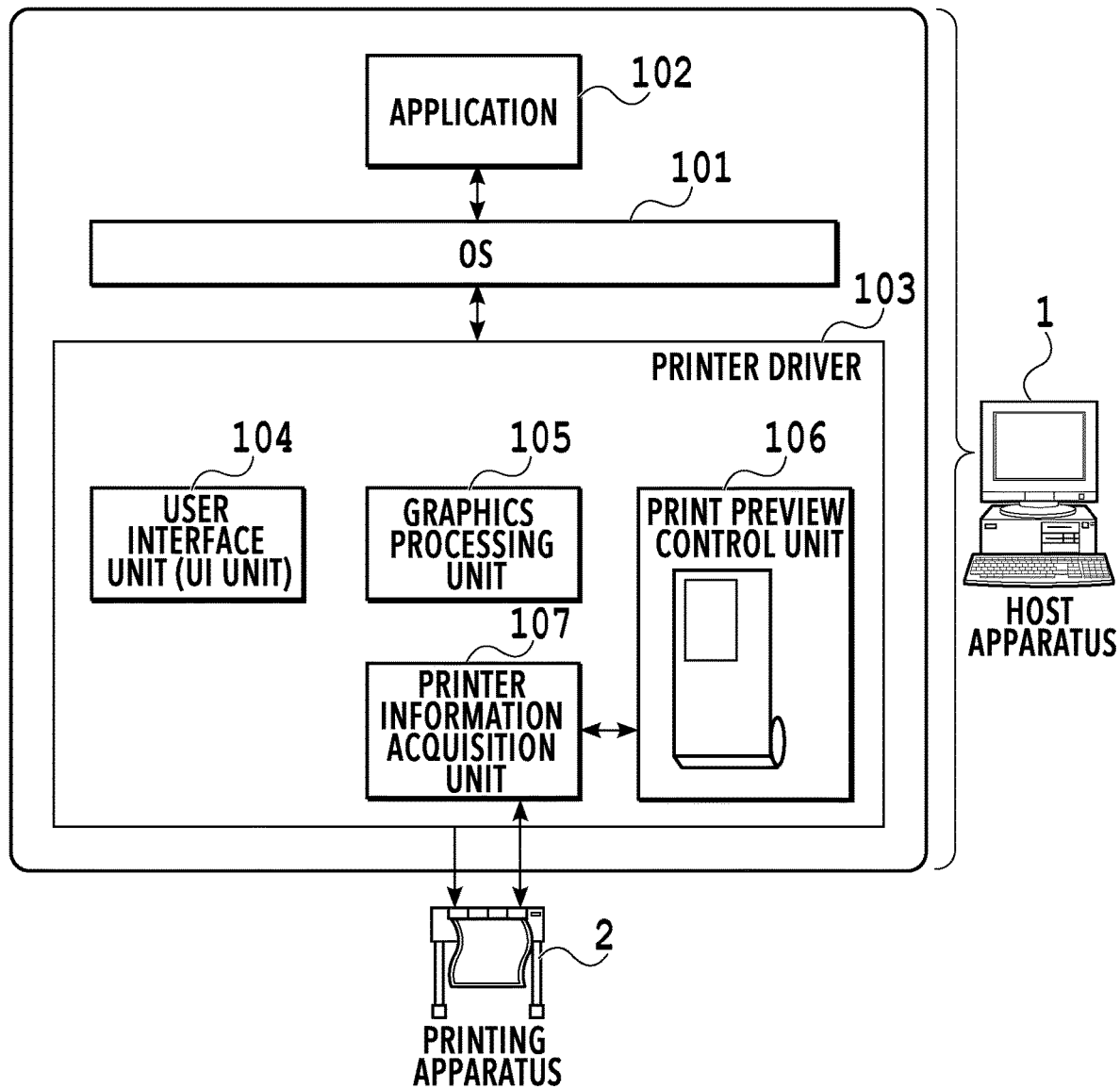
FIG. 1 is a diagram showing a software configuration of a print system usable in the present invention.

FIG. 1 is a diagram showing a software configuration of a print system usable in the present invention. The system includes a host apparatus 1 and a printing apparatus 2 connected to the host apparatus 1. The host apparatus 1 is, for example, a personal computer. On the host apparatus 1, an operating system (hereinafter abbreviated as "OS") 101, a printer driver 103 that is software for controlling the printing apparatus 2, and an application 102 for creating various documents are installed. In the case where a document created by the application 102 is printed by the printing apparatus 2, image data (application data) on the document is provided for the printer driver 103 via the OS 101.

The printer driver 103 includes a user interface (hereinafter "UI") unit 104, a graphics processing unit 105, a print preview control unit 106, and a printer information acquisition unit 107. The UI unit 104 accepts input by a user and provides a user with information via an input unit 206 and a display unit 207 (see FIG. 3) of the host apparatus 1. The graphics processing unit 105 executes predetermined image processing for image data received from the OS 101 and generates print data processible by the printing apparatus 2. The print preview control unit 106 sets a layout of an image to be printed on a print medium and provides a preview of the set layout. The printer information acquisition unit 107 accesses the printing apparatus 2 and acquires the sizes and types of print medium mounted on the printing apparatus 2.

Figure 2:
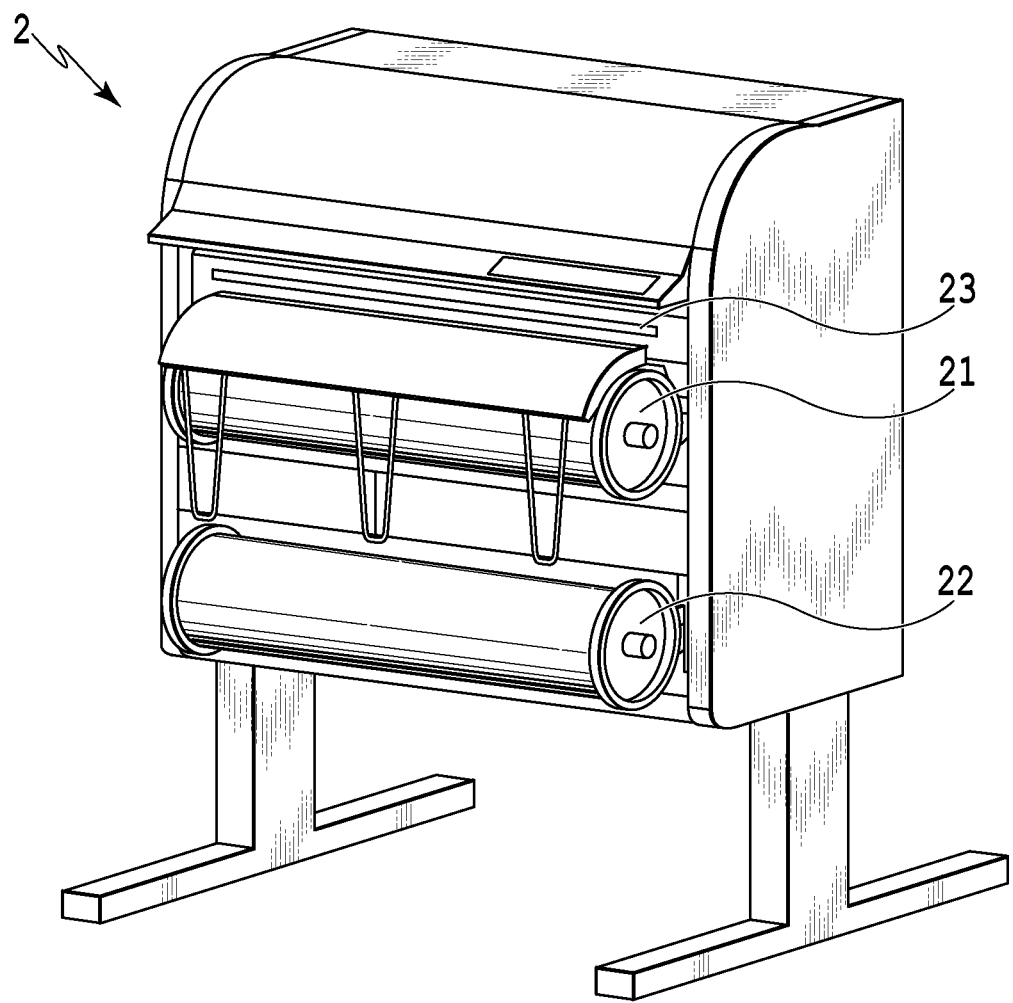
FIG. 2 is an exterior perspective view of a printing apparatus.

FIG. 2 is an exterior perspective view of the printing apparatus 2. The printing apparatus 2 of the present embodiment is a large format printer. In the printing apparatus 2, two types of print medium 21 and 22, each of which is a continuous and elongate sheet wound in a roll, are placed so as to be detachable from and attachable to the apparatus body. Here, the upper print medium 21 is referred to as a roll sheet 1 and the lower print medium 22 as a roll sheet 2. To the printing apparatus 2 of the present embodiment, various print medium having different widths and materials can be mounted in various combinations as the roll sheets 1 and 2. In the present embodiment, the number of roll sheets to be placed is not limited to two and may be three or more.

In the positions in the printing apparatus 2 where the respective roll sheets are mounted, sheet feeding openings are provided for drawing sheets unwound from the rolls into the body. The printing apparatus 2 feeds either one of the roll sheets 1 and 2 into the apparatus in accordance with print data received from the host apparatus 1, prints an image on the surface of the sheet, and discharges it from a discharge opening 23.

Figure 3:
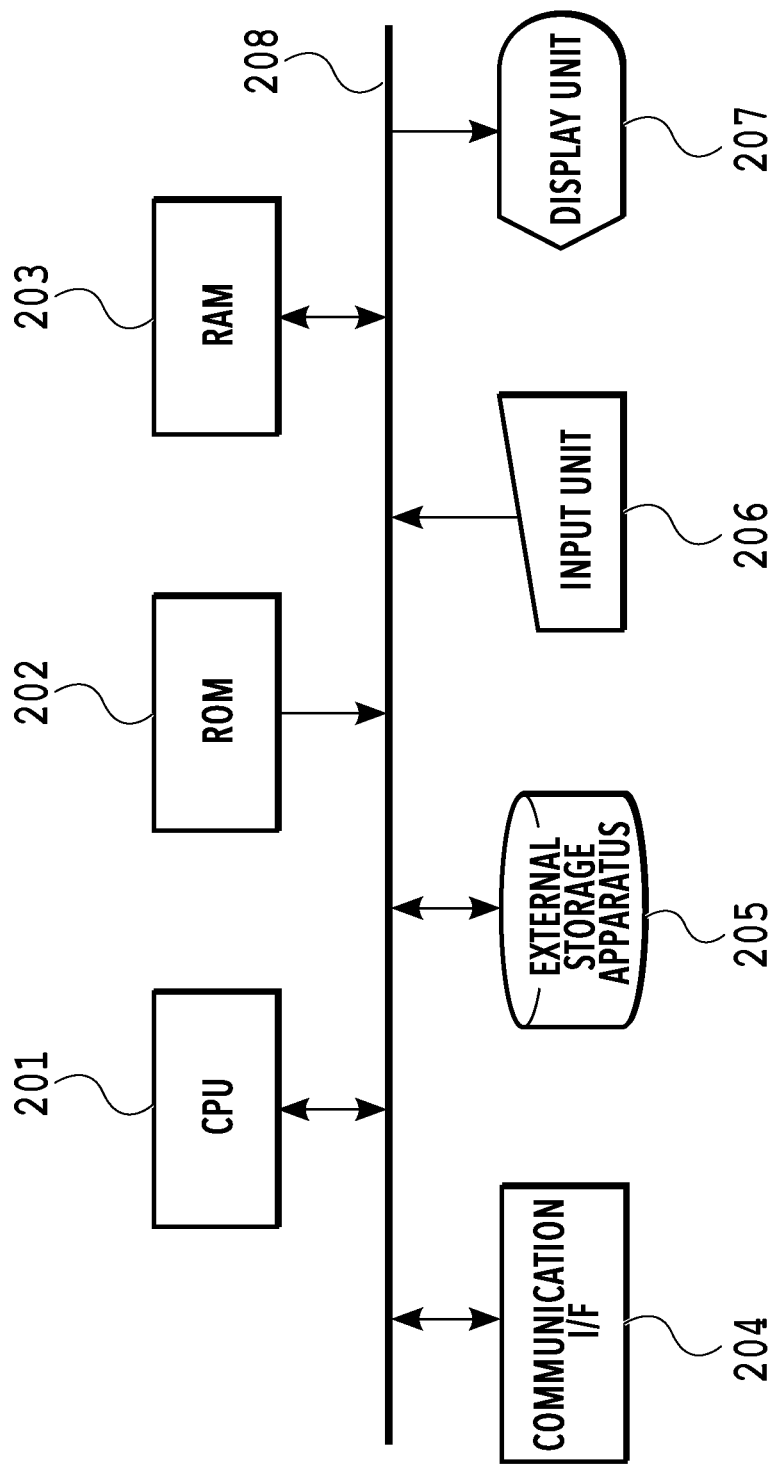
FIG. 3 is a block diagram showing a hardware configuration in a host apparatus.

FIG. 3 is a block diagram showing a hardware configuration in the host apparatus 1 to be a print control apparatus of the present embodiment. The host apparatus 1 has a CPU 201, a ROM 202, a RAM 203, a communication interface (I/F) 204, an external storage apparatus 205, the input unit 206, and the display unit 207. The CPU 201 controls the entire host apparatus 1 by using various mechanisms. The ROM 202 stores initialization programs executed by the CPU 201 and various types of data. The RAM 203 is used as a main memory or a work area for the CPU 201. The external storage apparatus 205 includes, for example, a hard disk drive (HDD), and stores various programs executable by the CPU 201. Programs for implementing processing shown by flowcharts to be described later are loaded from the external storage apparatus 205 and stored in the RAM 203 by the CPU 201.

The input unit 206 includes, for example, a keyboard and a mouse, and transmits instructions from a user to the CPU 201. The display unit 207 includes, for example, an LCD and a CRT, and displays various types of information under the control of the CPU 201. A characteristic print preview dialog of the present invention to be described later is displayed on the display unit 207 under the control of the CPU 201. The communication interface (I/F) 204 communicates with an external device such as the printing apparatus 2 under the control of the CPU 201.

FIG. 1 is referred to again. When a user issues a print command by means of a menu of the application 102 in order to cause the printing apparatus 2 to print a document created by the application 102, a print dialog is activated. Upon the push of a property button or the like given by the user in the print dialog, the UI unit 104 of the printer driver 103 is activated so that the user can confirm and change the settings of the printer driver currently selected.

Figure 4:
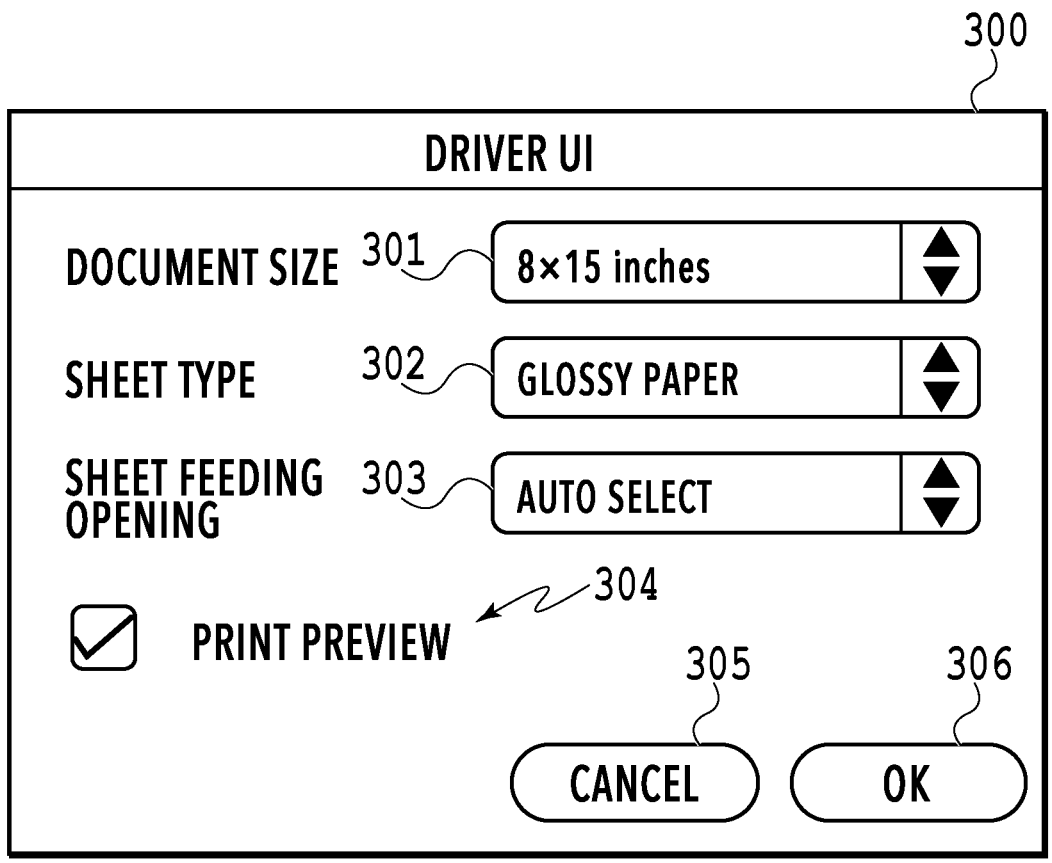
FIG. 4 shows an example of a driver display screen.

FIG. 4 shows an example of a driver display screen 300 that the activated UI unit 104 causes the display unit 207 to display. The driver display screen 300 includes a document size setting part 301 for selectively setting the size of a document (an image to be printed), a sheet type setting part 302 for selectively setting the type of sheet (print medium), and a sheet feeding opening setting part 303 for selectively setting a sheet feeding opening. In the printing apparatus 2 of the present embodiment, the two roll sheets 1 and 2 can be placed. The sheet feeding opening setting part 303 allows a user to set whether to cause the printer driver to automatically select which of the sheet feeding openings to use, the upper sheet feeding opening (for the roll sheet 1) or the lower sheet feeding opening (for the roll sheet 2). In the present embodiment, information about a document size and a sheet type is set for each page included in a print job.

The driver display screen 300 also includes a print preview setting part 304 for setting whether to display a print preview before printing, a cancel button 305 for cancelling the above settings, and an OK button 306 for confirming the above settings.

After the setting of each item, if a user pushes the OK button 306, the driver display screen 300 is closed. Then, if the user pushes, for example, a print start button in the print dialog of the application 102, a print command is issued and image data created by the application 102 is sent to the printer driver 103.

After receiving the image data, the print preview control unit 106 of the printer driver 103 displays the print preview dialog in accordance with the settings in the driver display screen 300. For example, in the case where a user checks the print preview setting unit 304, the print preview control unit 106 displays a print preview in the print preview dialog before print data is transmitted to the printing apparatus 2 with the push of the print start button. In the case where a user does not check the print preview setting unit 304, print data is transmitted to the printing apparatus 2 with the push of the print start button without any display of a print preview in the print preview dialog by the print preview control unit 106.

Figure 5:
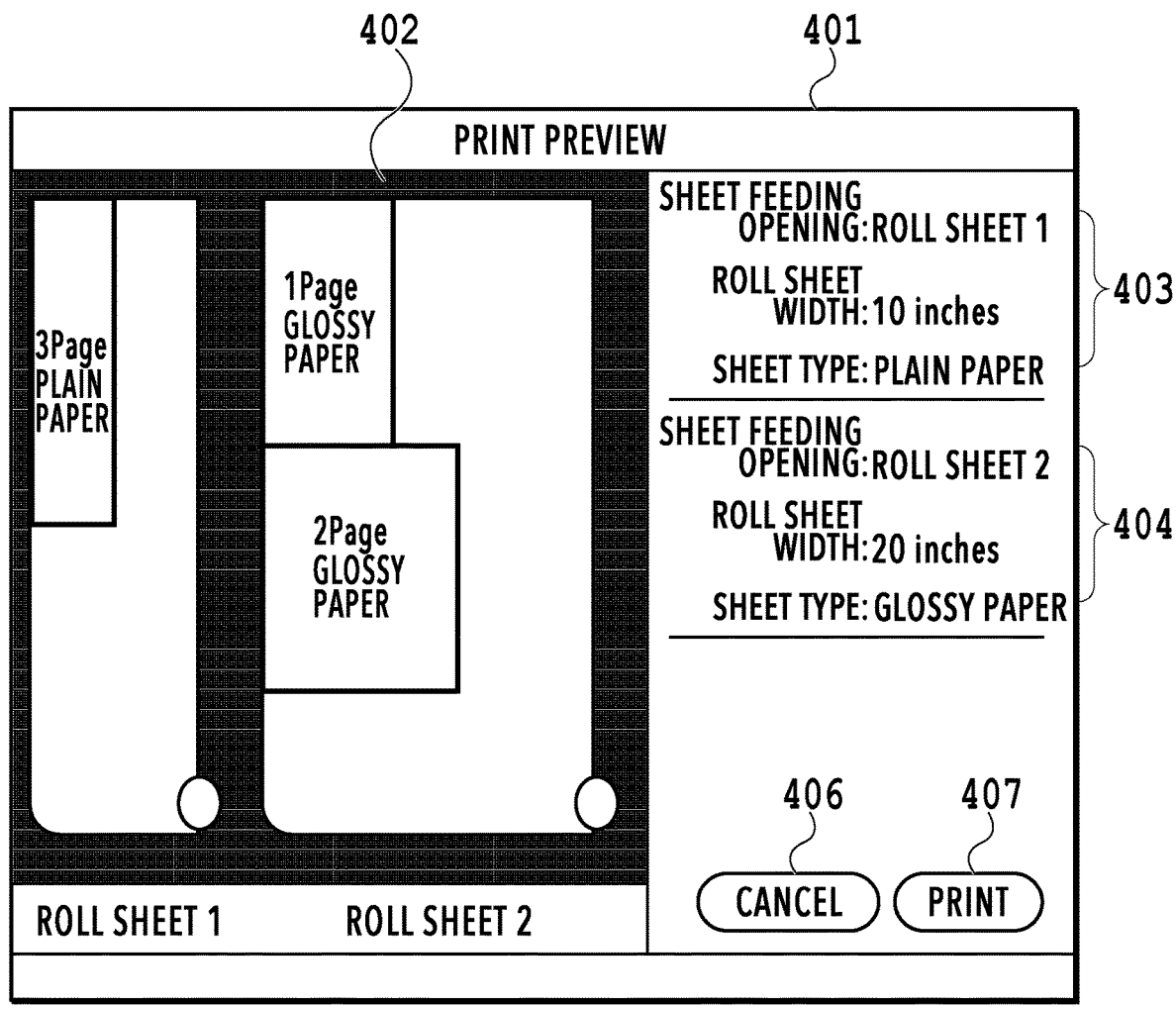
FIG. 5 shows an example of a print preview dialog in a first embodiment.

FIG. 5 shows a print preview dialog displayed by the print preview control unit 106 when the OK button 306 is pressed with the settings shown in FIG. 4. The print preview control unit 106 allocates a plurality of documents (pages) included in a print job to either one of the roll sheets 1 and 2 based on the settings in the driver display screen 300, the contents of the documents included in the print job, and information about the printing apparatus 2 acquired by the printer information acquisition unit 107. In the case where the print preview setting unit 304 is checked in the driver display screen 300, the print preview display part 402 shown in FIG. 5 displays how a plurality of pages are laid out on each of the roll sheets 1 and 2.

Besides the print preview display part 402, the print preview dialog 401 displays an information display part 403 for the roll sheet 1, an information display part 404 for the roll sheet 2, a cancel button 406, and a print button 407.

The information display part 403 for the roll sheet 1 displays the width and type of print medium currently mounted on the printing apparatus 2 as the roll sheet 1. Here, the information display part 403 shows that 10-inch-wide plain paper is mounted on the upper side of the printing apparatus 2 as the roll sheet 1. The information display part 404 for the roll sheet 2 displays the width and type of print medium currently mounted on the printing apparatus 2 as the roll sheet 2. Here, the information display part 404 shows that 20-inch-wide glossy paper is mounted on the lower side of the printing apparatus 2 as the roll sheet 2.

The print preview display part 402 displays how images of a plurality of pages are laid out on each of images representing the roll sheets 1 and 2. The widths of the images representing the roll sheets 1 and 2 in the print preview display part 402 are adjusted based on the ratio between a roll sheet width (10 inches) shown in the information display part 403 for the roll sheet 1 and a roll sheet width (20 inches) shown in the information display part 404 for the roll sheet 2. That is, the image representing the roll sheet 2 having a width of 20 inches is twice as wide as the image representing the roll sheet 1 having a width of 10 inches. Here, the third page is laid out on the image representing the roll sheet 1 and the first and second pages are laid out on the image representing the roll sheet 2.

The cancel button 406 is a button for cancelling a layout displayed in the print preview display part 402. For instance, in the case where a layout displayed in the print preview display part 402 is different from an intended result, a user can push the cancel button 406 and replace a print medium placed as the roll sheet 1 or 2 or remake a document in the application 102.

If a user pushes the print button 407 after checking a layout displayed in the print preview display part 402, the printer driver 103 transmits print data generated by the graphics processing unit 105 to the printing apparatus 2 in accordance with the layout created by the print preview control unit 106. This allows the printing apparatus 2 to print an image of each page sequentially on the roll sheet 1 or 2 based on the received information.

Figure 6:
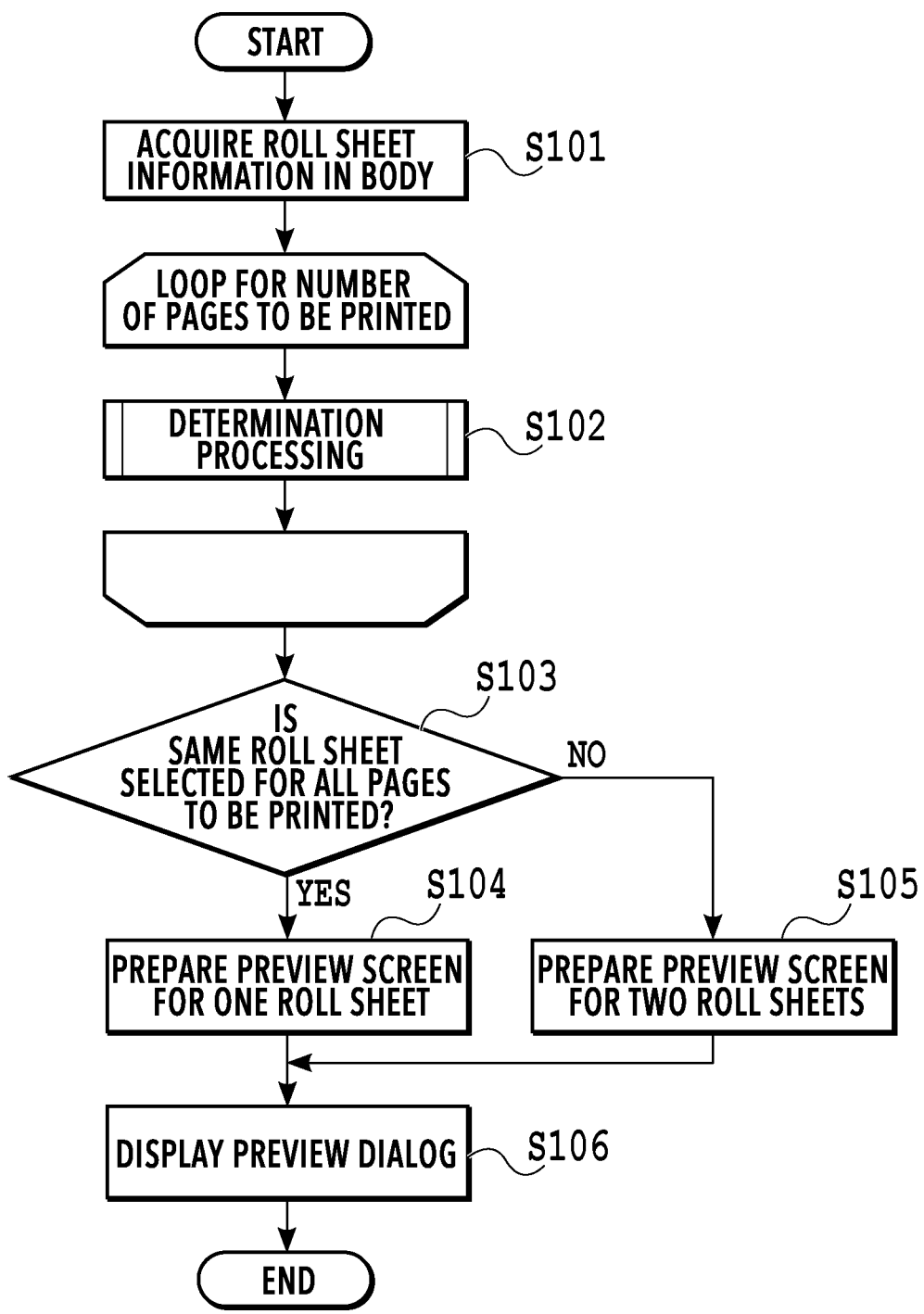
FIG. 6 is a flowchart illustrating print layout processing.

FIG. 6 is a flowchart illustrating print layout processing executed by the print preview control unit 106 of the present embodiment. This processing is started with the push of the OK button 306 in the driver display screen 300 described with reference to FIG. 4.

When the processing is started, the print preview control unit 106 first acquires print medium information in the printing apparatus 2 in step S101. More specifically, the print preview control unit 106 accesses the printing apparatus 2 via the printer information acquisition unit 107 and acquires the width and type of print medium placed as the roll sheet 1 and the width and type of print medium placed as the roll sheet 2. In a case where the print medium information cannot be acquired, it is possible to use information already stored in the printer driver 103 such as information that has been previously acquired.

In step S102, the print preview control unit 106 determines which sheet feeding opening should be allocated to each of pages included in a print job. More specifically, the print preview control unit 106 executes determination processing for determining which of the roll sheets 1 and 2 should be used for printing each of the pages.

Figure 7:
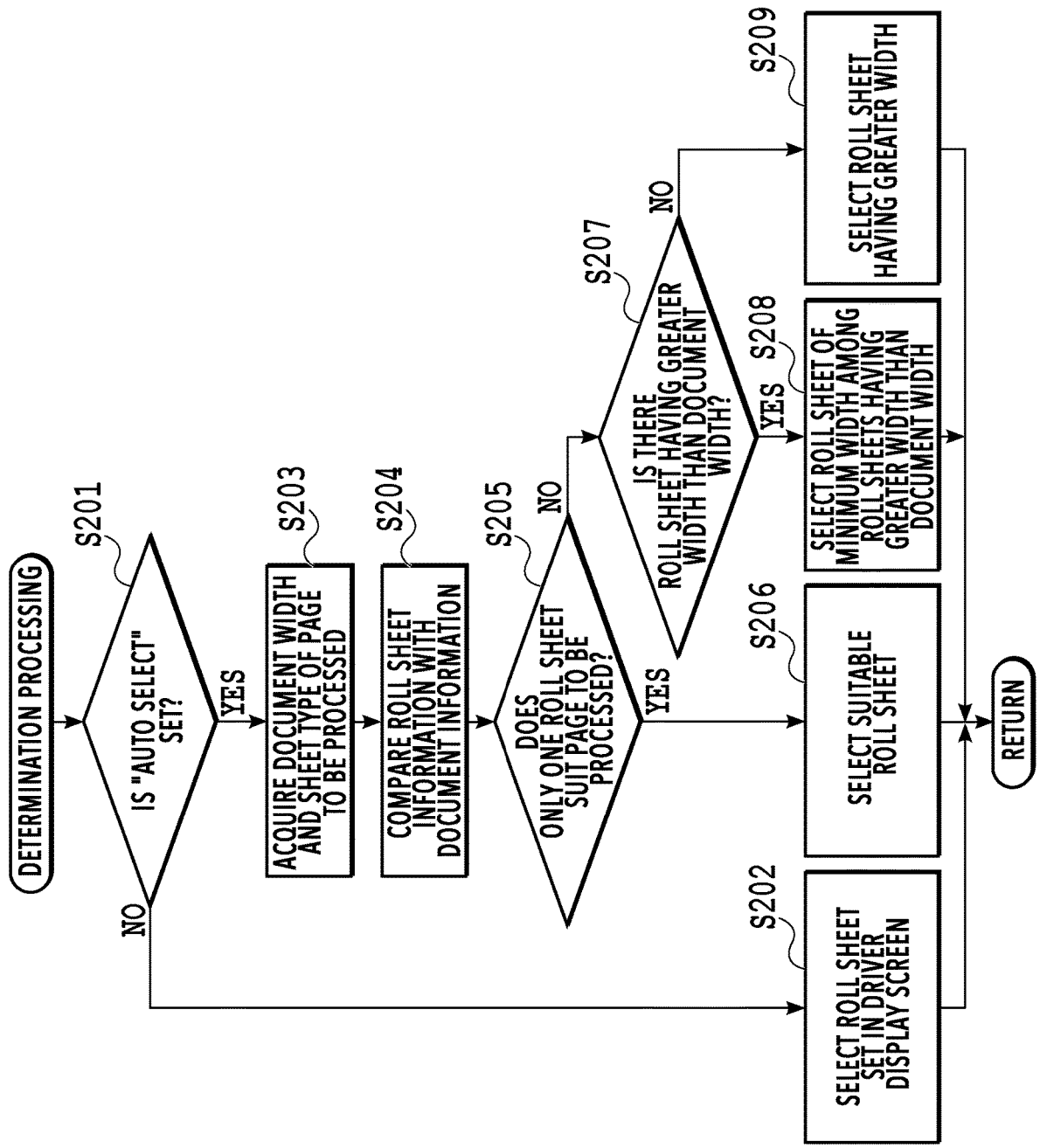
FIG. 7 is a flowchart illustrating the steps of determination processing in the first embodiment.

FIG. 7 is a flowchart illustrating the steps of the determination processing executed in step S102 of FIG. 6. When the processing is started, the print preview control unit 106 first determines in step S201 whether "auto select" is set in the sheet feeding opening setting part 303 of the driver display screen 300. In a case where "auto select" is not set (that is, a user designates a sheet feeding opening), the print preview control unit 106 proceeds to step S202, determines that roll sheet placed in the sheet feeding opening designated in the sheet feeding opening setting part 303 of the driver display screen 300 is a roll sheet for a page to be processed, and finishes the processing. In contrast, in a case where "auto select" is set, the print preview control unit 106 proceeds to step S203.

In step S203, the print preview control unit 106 acquires a document width set in the document size setting part 301 of the driver display screen 300 and a sheet type set in the sheet type setting part 302 for the page to be processed. In step S204, the print preview control unit 106 compares the document width and sheet type information acquired in the step S203 with the information about the roll sheets 1 and 2 acquired in step S101 and determines whether each of the roll sheets 1 and 2 suits the conditions for the page to be processed. To be more specific, the print preview control unit 106 checks whether each of the roll sheets 1 and 2 has a greater width than the document width of the page to be processed and corresponds to the sheet type of the page to be processed.

In step S205, the print preview control unit 106 determines whether only one of the roll sheets 1 and 2 suits the conditions for the page to be processed based on the result of the comparison in step S204. In a case of YES, the print preview control unit 106 proceeds to step S206, determines the suitable roll sheet as a roll sheet for the page to be processed, and finishes the processing. In a case of NO, the print preview control unit 106 proceeds to step S207.

In step S207, the print preview control unit 106 determines whether at least one of the roll sheets 1 and 2 has a greater width than the document width of the page to be processed. In a case of YES, the print preview control unit 106 proceeds to step S208, determines one of the roll sheets 1 and 2 that has a greater width than the document width of the page to be processed and has a less roll sheet width as a roll sheet for the page to be processed, and finishes the processing. In a case of NO, the print preview control unit 106 proceeds to step S209, determines one of the roll sheets 1 and 2 that has a greater roll sheet width as a roll sheet for the page to be processed, and finishes the processing.

In the determination processing, if NO in step S205, there are a case where both of the roll sheets 1 and 2 are suitable for the page to be processed and a case where neither of them are suitable. In the former case, a roll sheet that will have less margin is determined as a roll sheet for the page to be processed in step S208. In the latter case, there are a case where the sheet type is unsuitable and a case where the width is unsuitable.

In the present embodiment, when "auto select" is set, a high priority is given to such printing as to prevent a document image from sticking out of a print medium and to minimize a margin. Accordingly, in step S208, there is a case where a roll sheet having an unsuitable sheet type but having a greater width than that of the document image is selected. In step S209, a roll sheet having an unsuitable sheet type and document width but capable of minimizing an unprinted area in the document image area is selected as a print medium for the page to be processed. If the roll sheets 1 and 2 are print medium identical to each other in type and width, the setting can be made according to various other requirements, for example, by giving a higher priority to the roll sheet 1 or using the settings for the immediately preceding page to be processed.

The flowchart of FIG. 6 is referred to again. When the determination processing in step S102 is completed for all the pages and the allocation of all the pages to roll sheets is finished, the print preview control unit 106 proceeds to step S103 and determines whether the same roll sheet has been selected for all the pages. In a case of YES, the print preview control unit 106 proceeds to step S104 and prepares a preview screen for one roll sheet as the prior art. In a case of NO, the print preview control unit 106 proceeds to S105 and prepares a preview screen for two roll sheets.

In step S106, the preview screen prepared in step S104 or step S105 is used to display the print preview dialog 401 as shown in FIG. 5 in the display unit 207. That is the end of the processing.

FIG. 5 is referred to again. The print preview display part 402 displays the result of the print layout processing executed by the print preview control unit 106 in accordance with the flowcharts of FIGS. 6 and 7. FIG. 5 shows a case where "auto select" is set for a print job including the first page of a document size of 8×15 inches and a sheet type of glossy paper, the second page of 12×15 inches and glossy paper, and the third page of 5×20 inches and plain paper.

Since only the roll sheet 2 suits the print conditions for the first and second pages, the roll sheet 2 is selected in step S206. Since only the roll sheet 1 suits the print conditions for the third page, the roll sheet 1 is selected in step S206. As a result, the print preview display part 402 displays the state where the third page is laid out on the roll sheet 1 and the first and second pages are laid out on the roll sheet 2.

Figure 8:
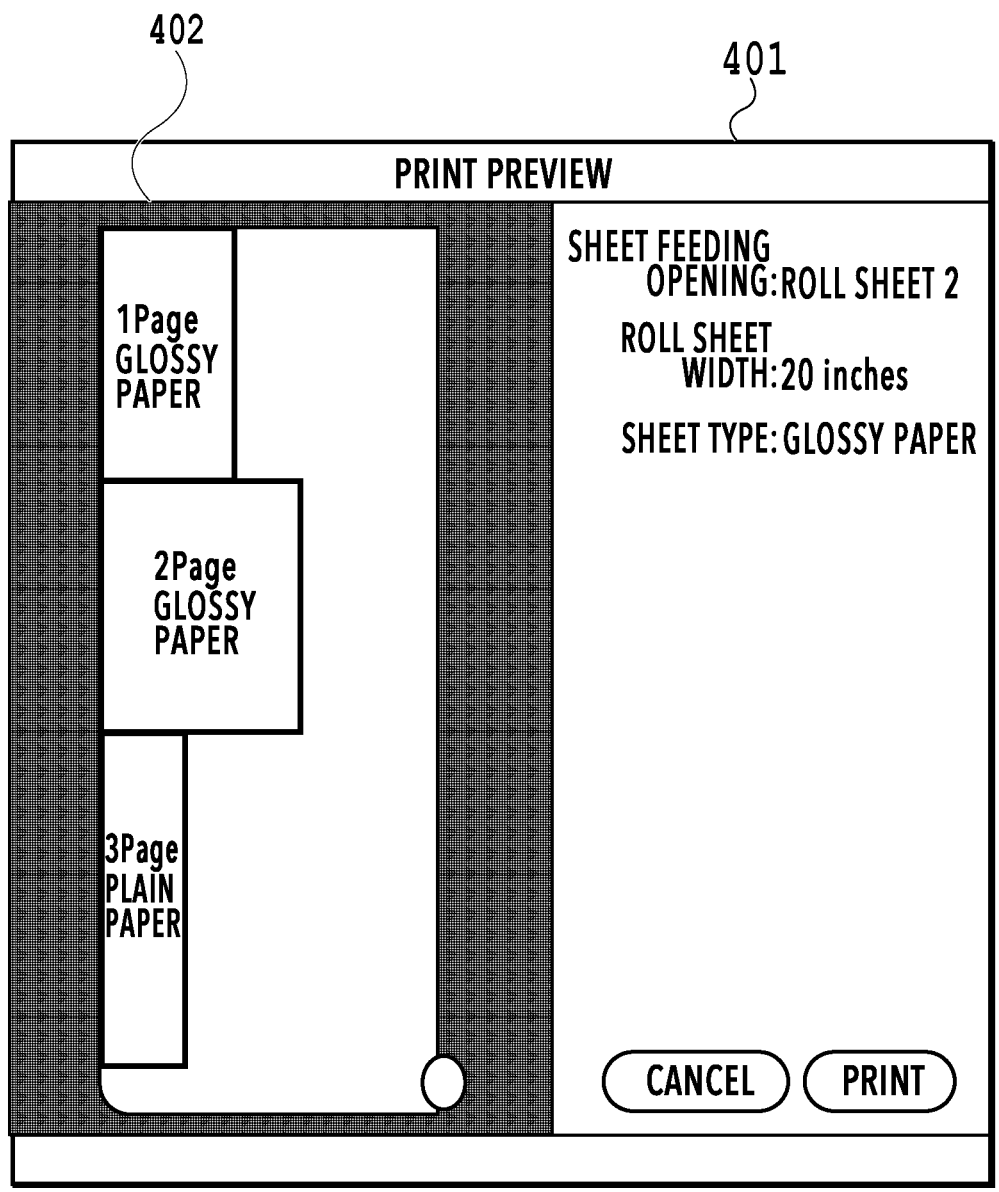
FIG. 8 shows an example of the print preview dialog in the first embodiment.

FIG. 5 shows an example of display of the print preview dialog in the case where a preview screen for two roll sheets has been prepared in step S105. On the other hand, FIG. 8 shows an example of display of the print preview dialog in the case where a preview screen for one roll sheet has been prepared in step S104. The display as in FIG. 8 is made, for instance, when the sheet type of third page is not plain paper but glossy paper in the above example. However, the display method for the print preview dialog 401 of the present embodiment is not limited to that shown in FIGS. 5 and 8. For example, steps S103 and S104 in FIG. 6 may be omitted and the two roll sheets may be consistently displayed on the same screen as shown in FIG. 5.

Figure 9A:
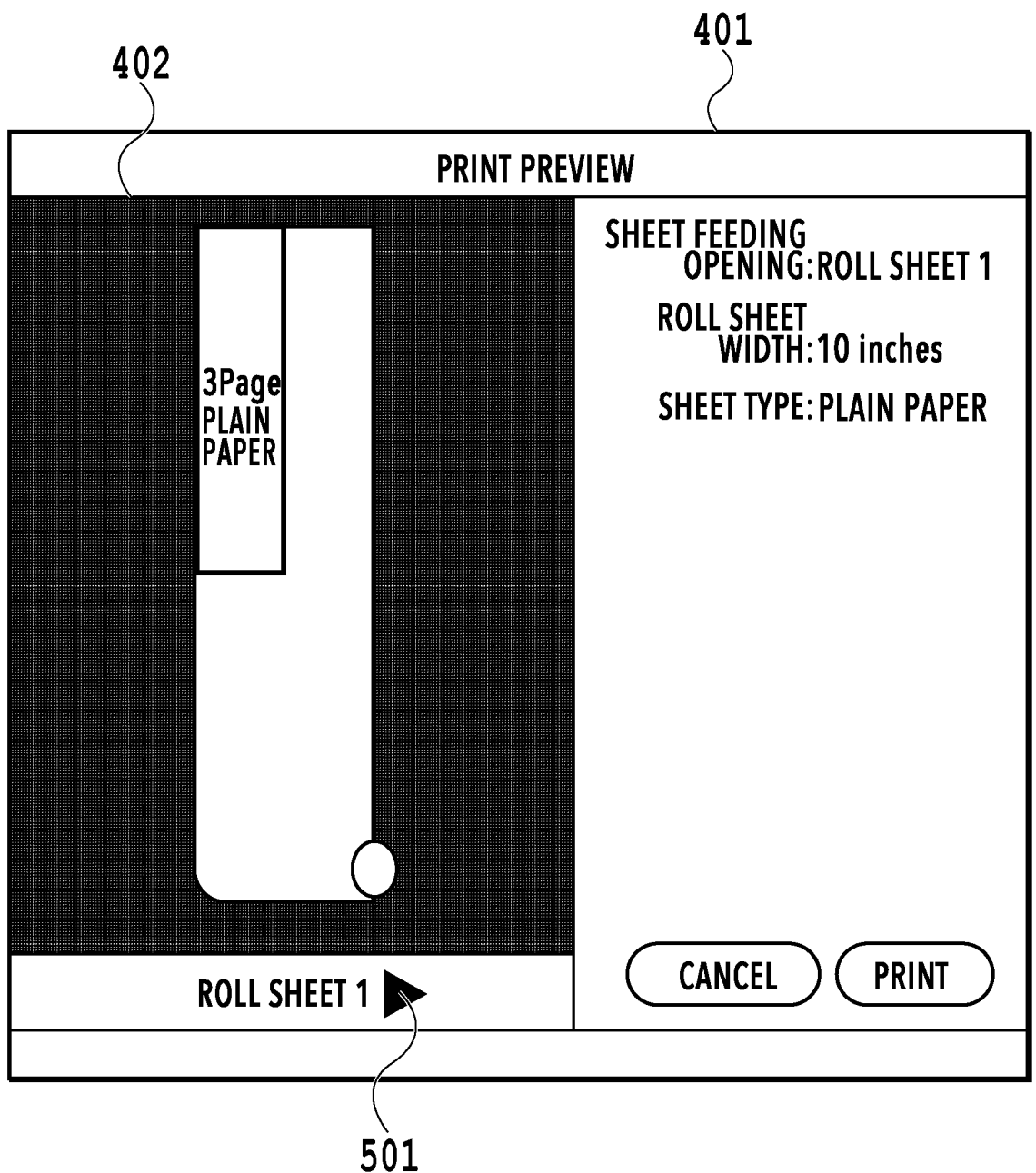
FIGS. 9A and 9B show examples of the print preview dialog in the first embodiment.
Figure 9B:
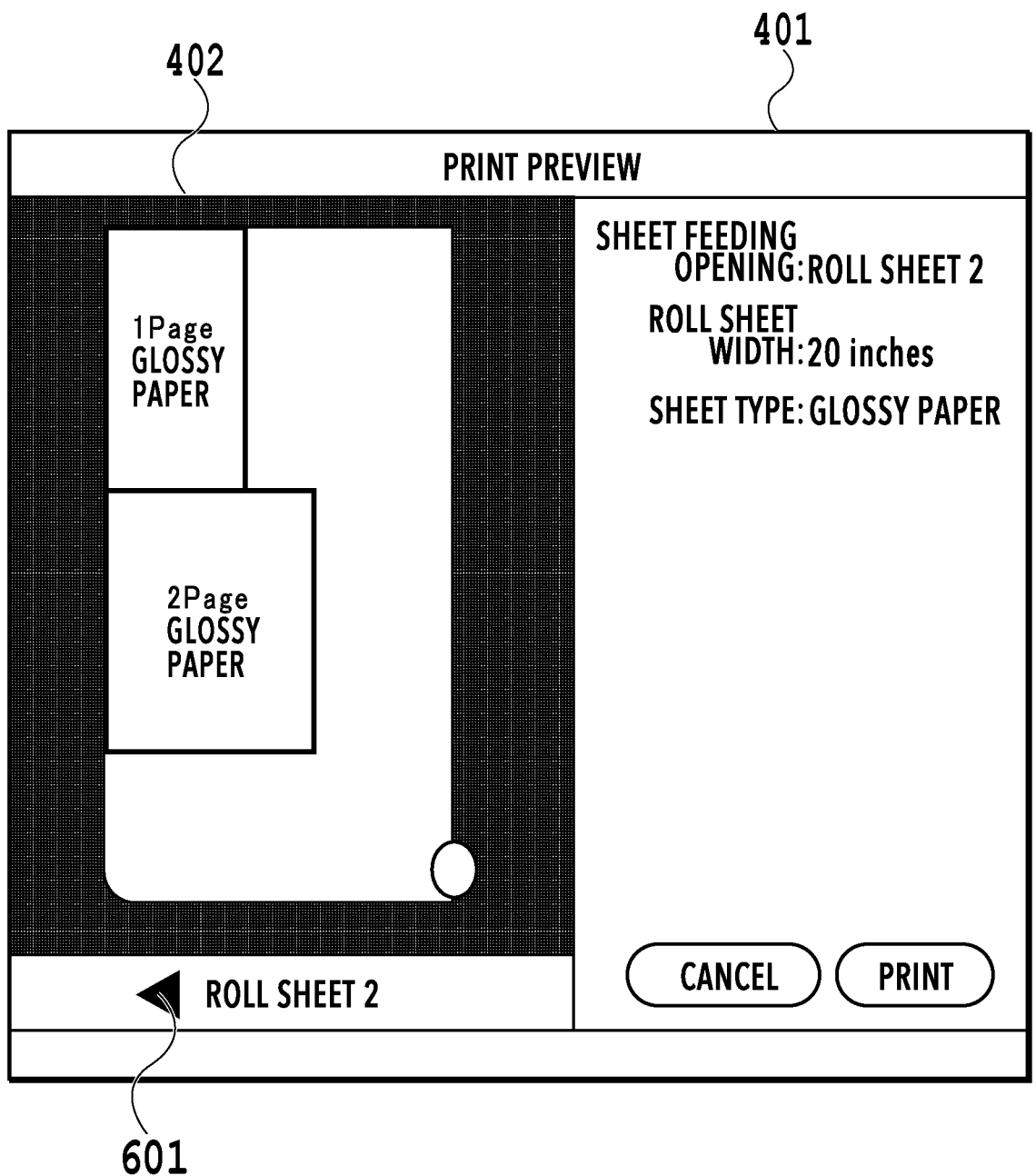

FIGS. 9A and 9B are diagrams showing yet another display method for the print preview dialog. In this method, a roll sheet displayed in the print preview display part 402 can be switched between the roll sheet 1 and the roll sheet 2 with the press on a display switching button 501 or 601.

Figure 10:
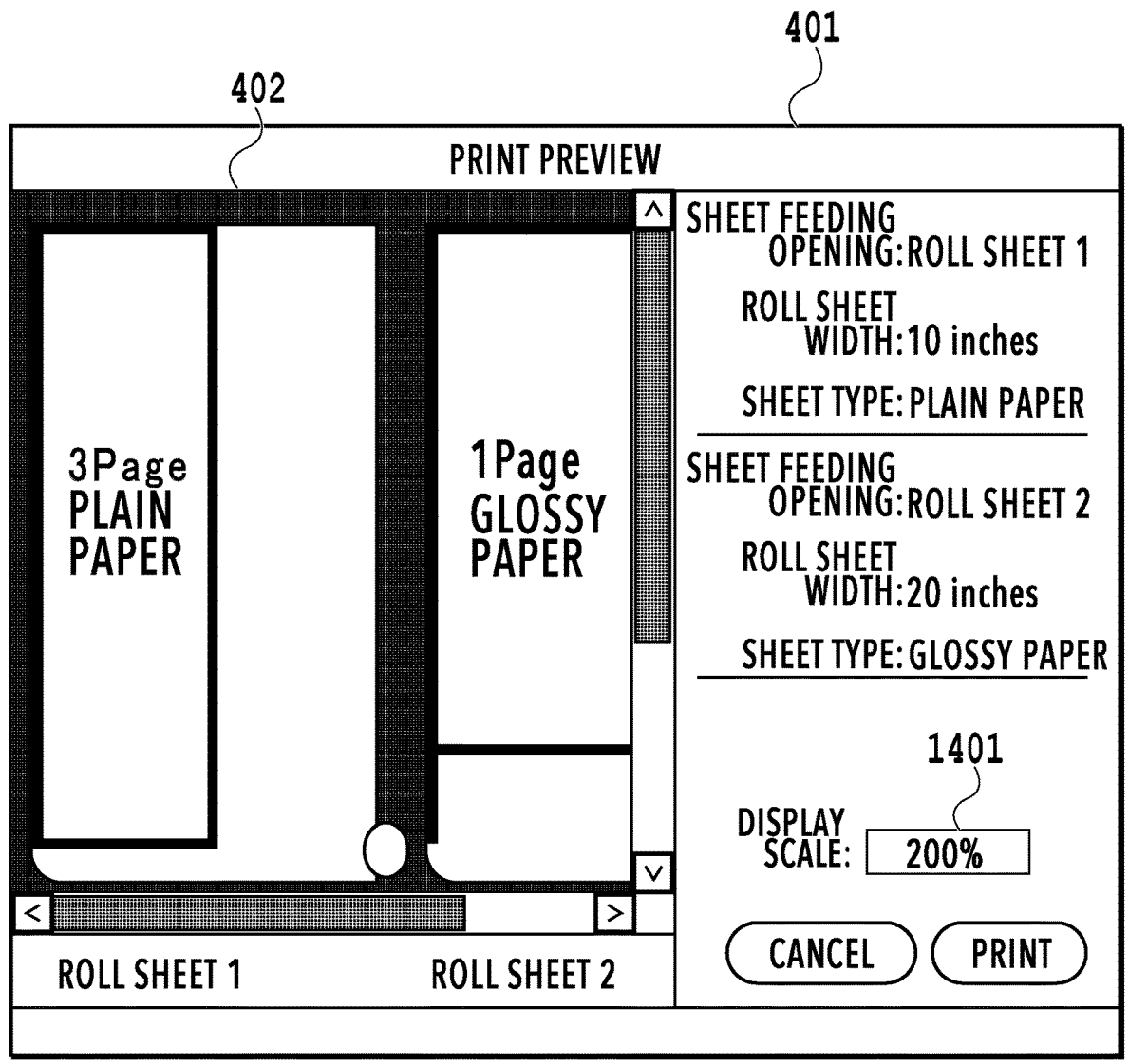
FIG. 10 shows an example of the print preview dialog in the first embodiment.

Alternatively, as shown in FIG. 10, a display scaling setting part 1401 may be prepared so that a user can rescale an image displayed in the print preview display part 402. In this method, providing scroll bars on the sides of the print preview display part 402 is effective in allowing a user to confirm the entire layout on the roll sheets 1 and 2 even in the case of enlarged display. Although it is preferable that the same scale (reduction ratio) be used for the roll sheets 1 and 2 in order to get a grasp of a relative magnitude relation between them, the present embodiment is not limited to this. The scales used for the roll sheets 1 and 2 may be individually changed.

Further, in a case of NO in step S207 and a roll sheet having a greater width is selected in step S209, the print preview dialog 401 may make a notification that a document image will stick out of the roll sheet or display an error message. Considering the case where a user replaces the roll sheet in response to the display, it is effective to further provide the print preview dialog 401 with a button for updating roll sheet information. This makes it possible to prevent useless printing not intended by a user more certainly.

As described above, according to the present embodiment, a print preview for each page can be correctly displayed even in the case of a print job including a plurality of pages designating different sizes and types of print medium and using print medium fed from a plurality of sheet feeding openings. As a result, a user can correctly confirm the layout of each page before the execution of print operation, which avoids the pages from being printed in an unintended layout.

Second Embodiment

Also in the present embodiment, layout processing is executed in accordance with the flowchart of FIG. 6 by using the print system described with reference to FIGS. 1 to 3 as in the first embodiment. The present embodiment is different from the first embodiment in that layout processing for a sheet-saving mode is prepared.

Figure 11A:
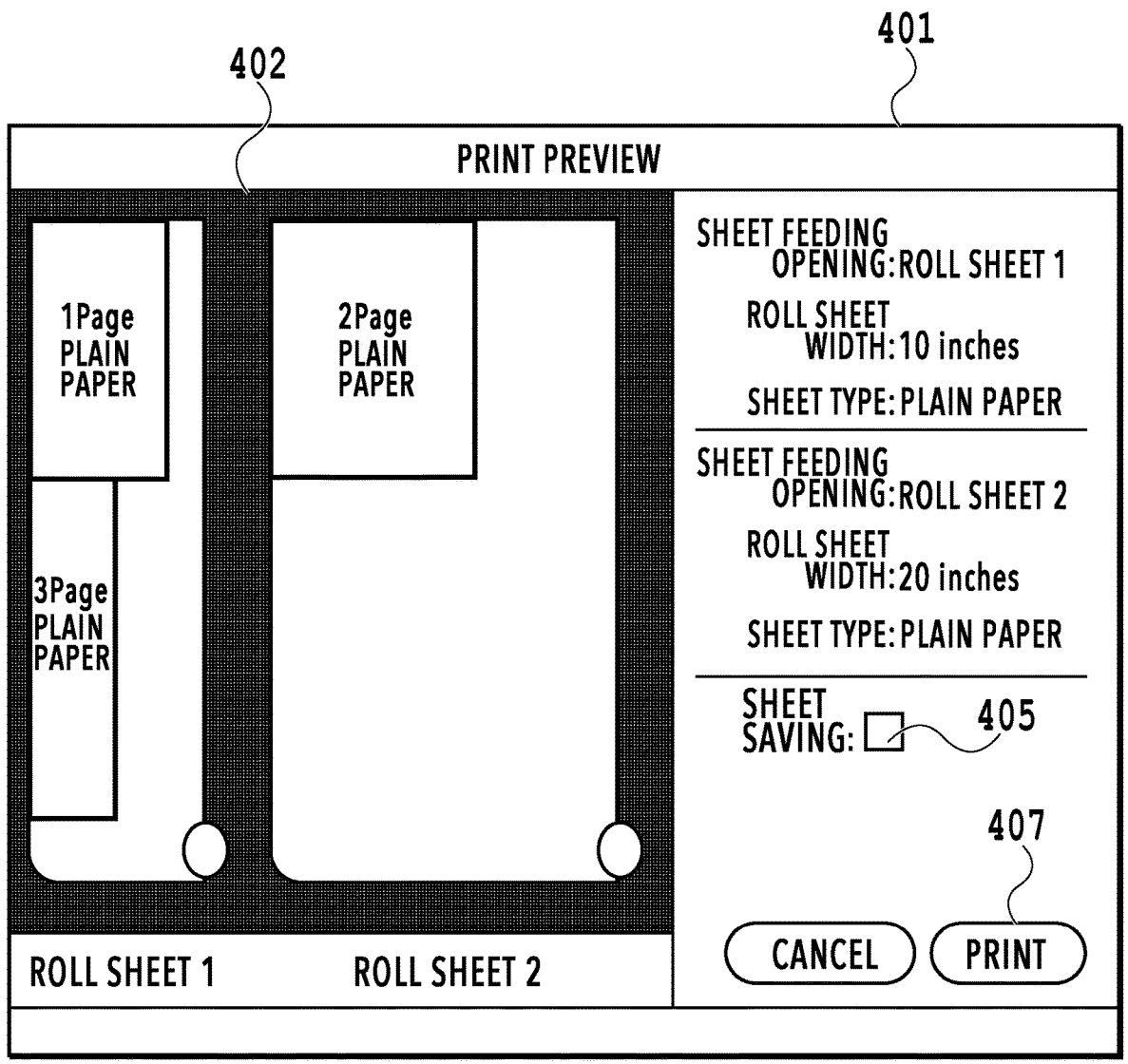
FIGS. 11A and 11B show examples of a print preview dialog in a second embodiment.
Figure 11B:
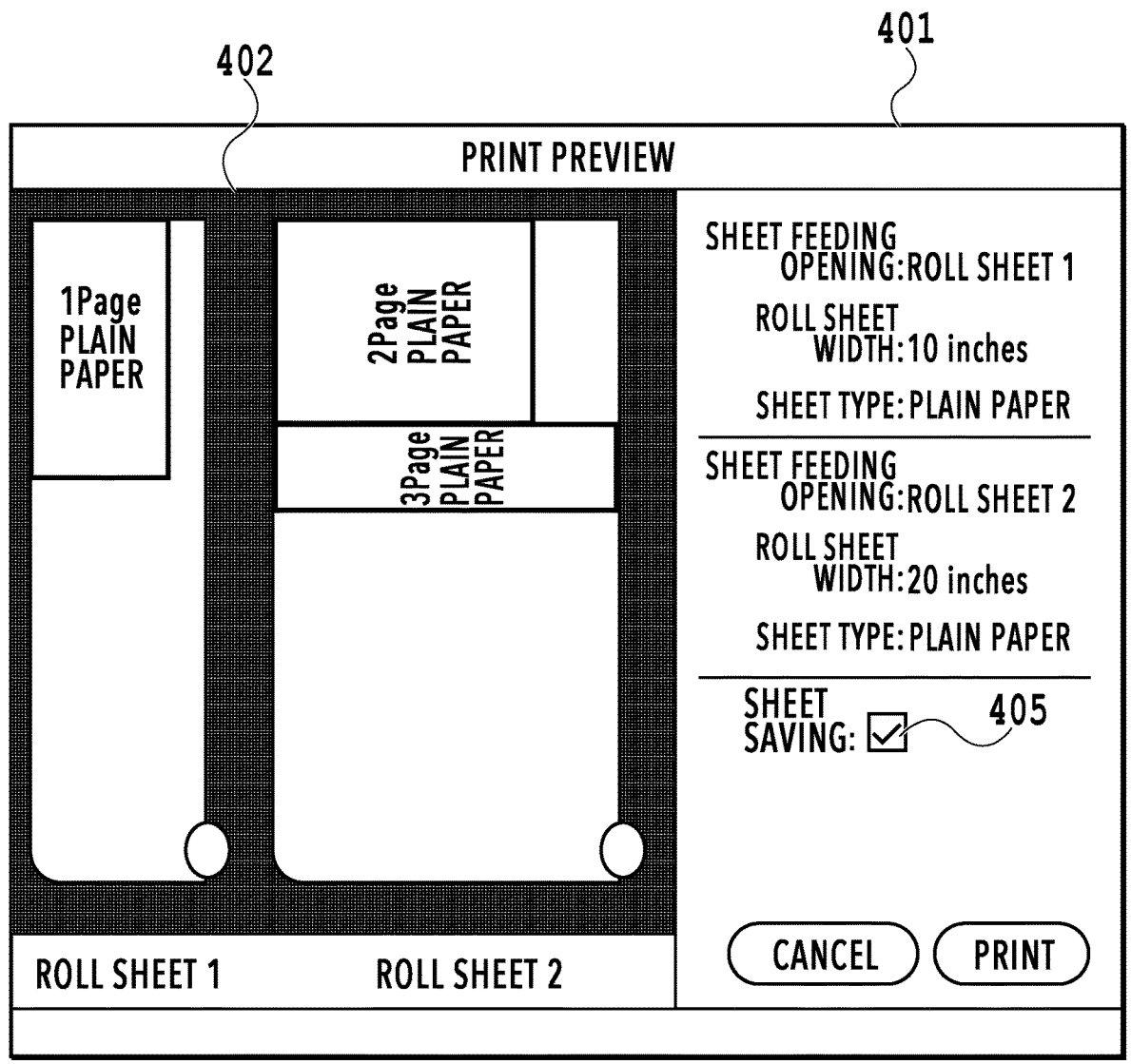

FIGS. 11A and 11B show examples of the print preview dialog 401 displayed by the print preview control unit 106 of the present embodiment. The print preview dialog 401 of the present embodiment has a sheet-saving checkbox 405 in addition to the items described in the first embodiment.

The sheet-saving checkbox 405 is a checkbox that is checked by a user when the user wants to reduce the consumption of roll sheets. If the sheet-saving checkbox 405 is checked, the print preview control unit 106 lays out a plurality of pages in such an orientation that the consumption of roll sheets is reduced and displays the layout in the print preview display part 402.

FIG. 11A shows the print preview dialog 401 in a case where the sheet-saving checkbox 405 is not checked. Meanwhile, FIG. 11B shows the print preview dialog 401 in a case where the sheet-saving checkbox 405 is checked under the same conditions as in FIG. 11A. In a case where the sheet-saving checkbox 405 is checked, the print preview control unit 106 of the present embodiment sets the orientation of each document so as to minimize a margin of a roll sheet and a consumption in the vertical direction.

Figure 12A:
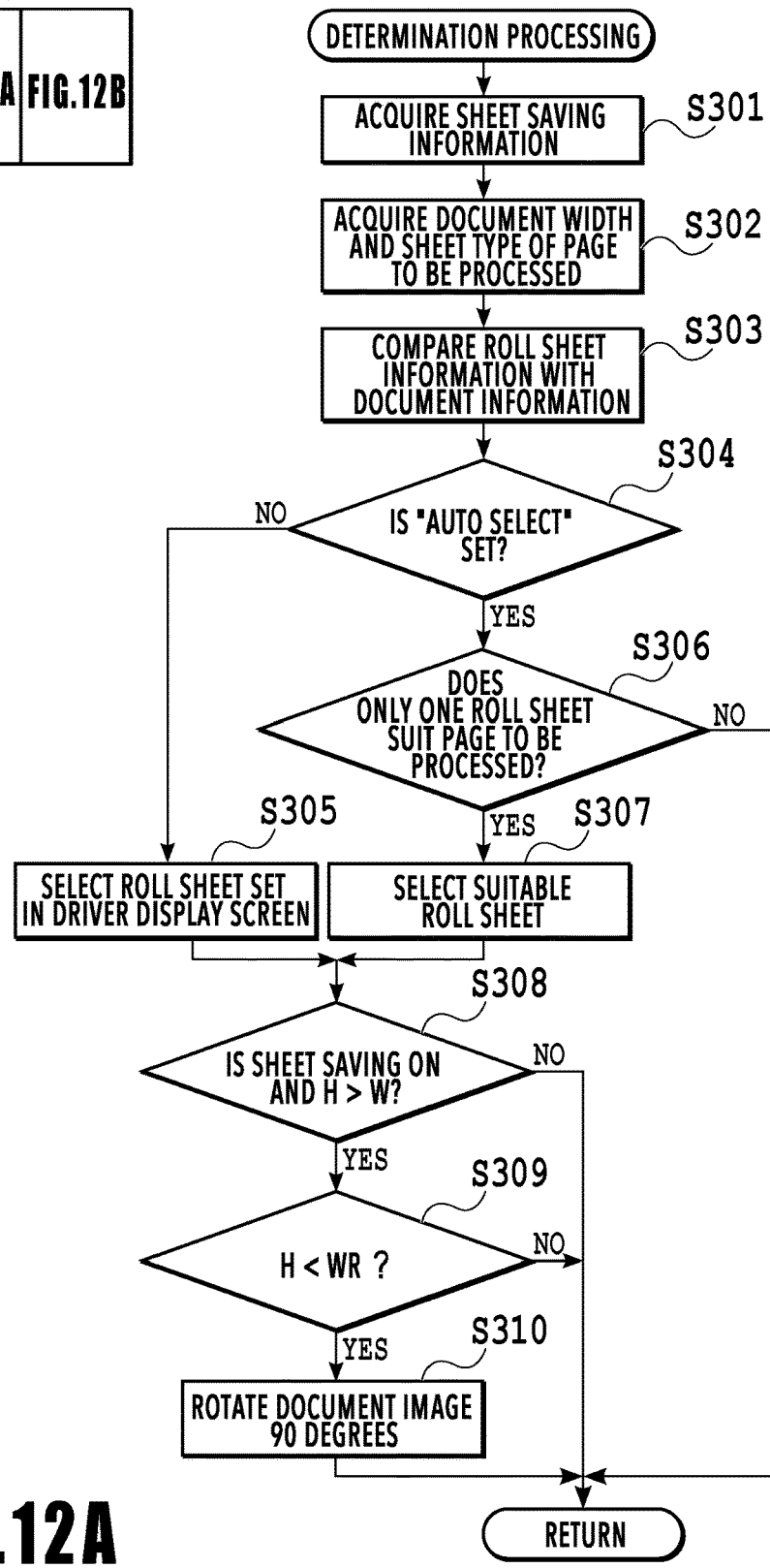
FIG. 12A is a flowchart illustrating the steps of determination processing in the second embodiment.
Figure 12B:
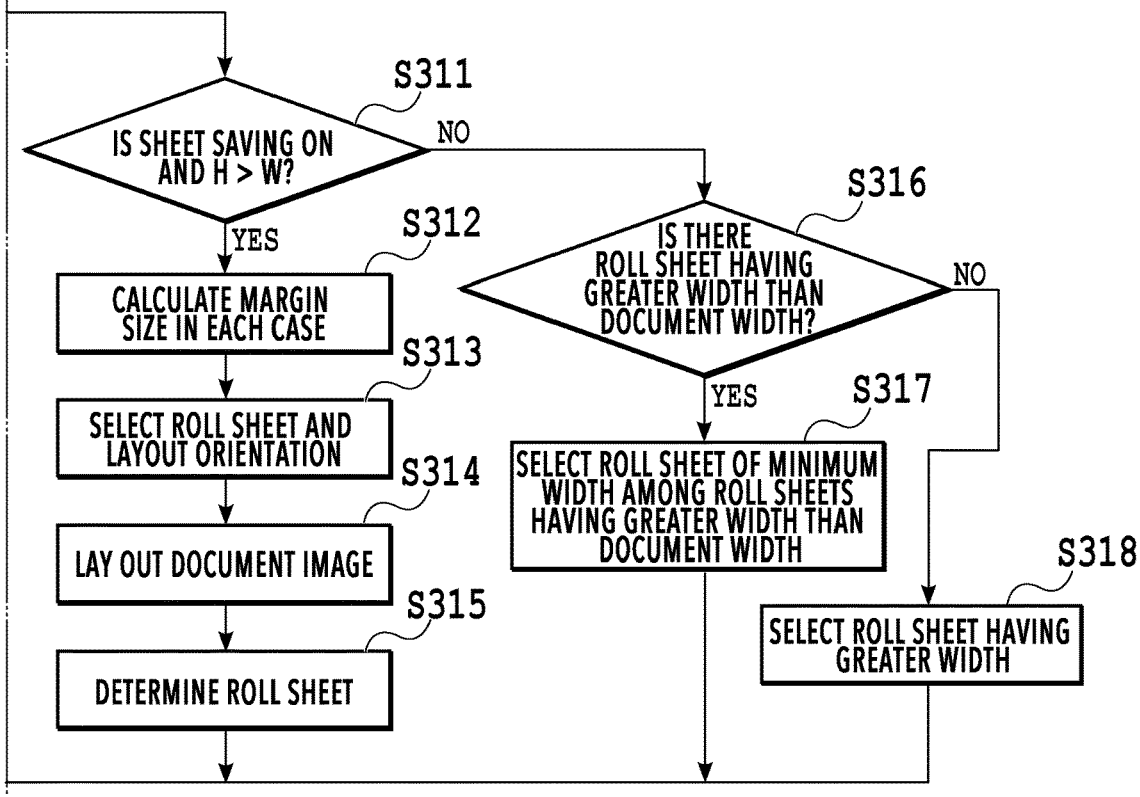
FIG. 12B is a flowchart illustrating the steps of determination processing in the second embodiment.

FIGS. 12A and 12B show a flowchart illustrating the steps of determination processing executed by the print preview control unit 106 of the present embodiment in step S102 of FIG. 6. When the processing is started, the print preview control unit 106 first acquires check information in the sheet-saving checkbox 405 in step S301.

The subsequent steps S302, S303, S304, S305, S306, and S307 are the same as steps S203, S204, S201, S202, S205, and S206 in the flowchart of FIG. 7, respectively. Thus, the description thereof is omitted here.

In step S308, the print preview control unit 106 determines whether sheet-saving check information indicates ON and a height H (length in the roll sheet conveying direction) of a page to be processed is greater than a width W (length in the roll sheet width direction) of the page. In a case of NO (H≤W), the print preview control unit 106 determines that the current layout presents no problem about the page to be processed and finishes the processing.

In a case of YES (H>W) in step S308, the print preview control unit 106 proceeds to step S309 and determines whether the height H of the page to be processed is less than a width WR of the roll sheet set in steps S307 and S308. In a case of NO (H≥WR), the print preview control unit 106 determines that the current layout presents no problem about the page to be processed and finishes the processing. In contrast, in a case of YES (H<WR), the print preview control unit 106 rotates a document image of the page to be processed 90 degrees (or 270 degrees) in step S310 and then finishes the processing.

In step S311, the print preview control unit 106 determines whether the sheet-saving check information indicates ON and the height H of the page to be processed is greater than the width W. The print preview control unit 106 proceeds to step S312 in a case of YES (H>W) and to step S316 in a case of NO (H≤W).

In step S312, the print preview control unit 106 calculates the size of a margin in the width direction, which is left when the page to be processed is laid out, for each of the case where the image of the page to be processed is rotated 90 degrees and the case where the image is not rotated, and for each of the roll sheets 1 and 2.

In step S313, based on the four types of margin sizes calculated in step S312, the print preview control unit 106 determines a roll sheet and a layout orientation (portrait or landscape) that should be used for printing of the page to be processed. More specifically, if the margin size exhibits a positive value in some layouts, the print preview control unit 106 selects a roll sheet and a layout orientation capable of minimizing the margin size among them. If the margin size exhibits a negative value in all the layouts, that is, if the image sticks out of a print medium in all the layouts, the print preview control unit 106 selects a roll sheet and a layout orientation capable of minimizing the size of the stuck-out portion among them.

In step S314, the print preview control unit 106 lays out the image of the page to be processed in accordance with the roll sheet and layout orientation determined in step S313. Then, in step S315, the print preview control unit 106 determines the selected roll sheet as a roll sheet for the page to be processed and finishes the processing. Since steps S316 to S318 are the same as steps S207 to S209 in the flowchart of FIG. 7, the description thereof is omitted here.

The print preview display part 402 in FIGS. 11A and 11B displays the result of the print layout processing executed by the print preview control unit 106 in accordance with the flowcharts of FIGS. 6, 12A and 12B. FIGS. 11A and 11B show a case where a print job including the first to third pages of 8×15-inch, 12×15-inch, and 5×20-inch plain paper is input when 10-inch-wide plain paper is placed as the roll sheet 1 and 20-inch-wide plain paper is placed as the roll sheet 2 in the printing apparatus 2.

In FIG. 11A where the sheet-saving checkbox is not checked, layout processing is executed so as to minimize margins while fixing the widths of the pages to 8 inches, 12 inches, and 5 inches, respectively. As a result, the first and third pages are laid out on the roll sheet 1 and the second page is laid out on the roll sheet 2, all the pages being in the portrait orientation.

In this case, print time required for the entire job can be reduced by performing print operation in the order of the first and third pages laid out on one roll sheet and the second page laid out on the other roll sheet. The order of printing the pages may be changed by the printer driver 103 based on the result of the layout processing executed by the print preview control unit 106. Alternatively, the print preview control unit 106 may directly access a print file and change the order of printing. In either case, by seeing the print preview, a user can confirm a situation in which the first and third pages are to be continuously printed on the roll sheet 1 and only the second page is to be printed on the roll sheet 2 before print operation.

On the other hand, in FIG. 11B where the sheet-saving checkbox is checked, layout processing is executed so as to minimize margins while allowing rotation processing for each page. As a result, the first page is laid out in the portrait orientation on the roll sheet 1 and the second and third pages are laid out in the landscape orientation on the roll sheet 2. A comparison between FIGS. 11A and 11B clearly shows that margins in the width direction are small and a consumption in the height direction is reduced in FIG. 11B where the sheet-saving checkbox is checked.

Figure 13:
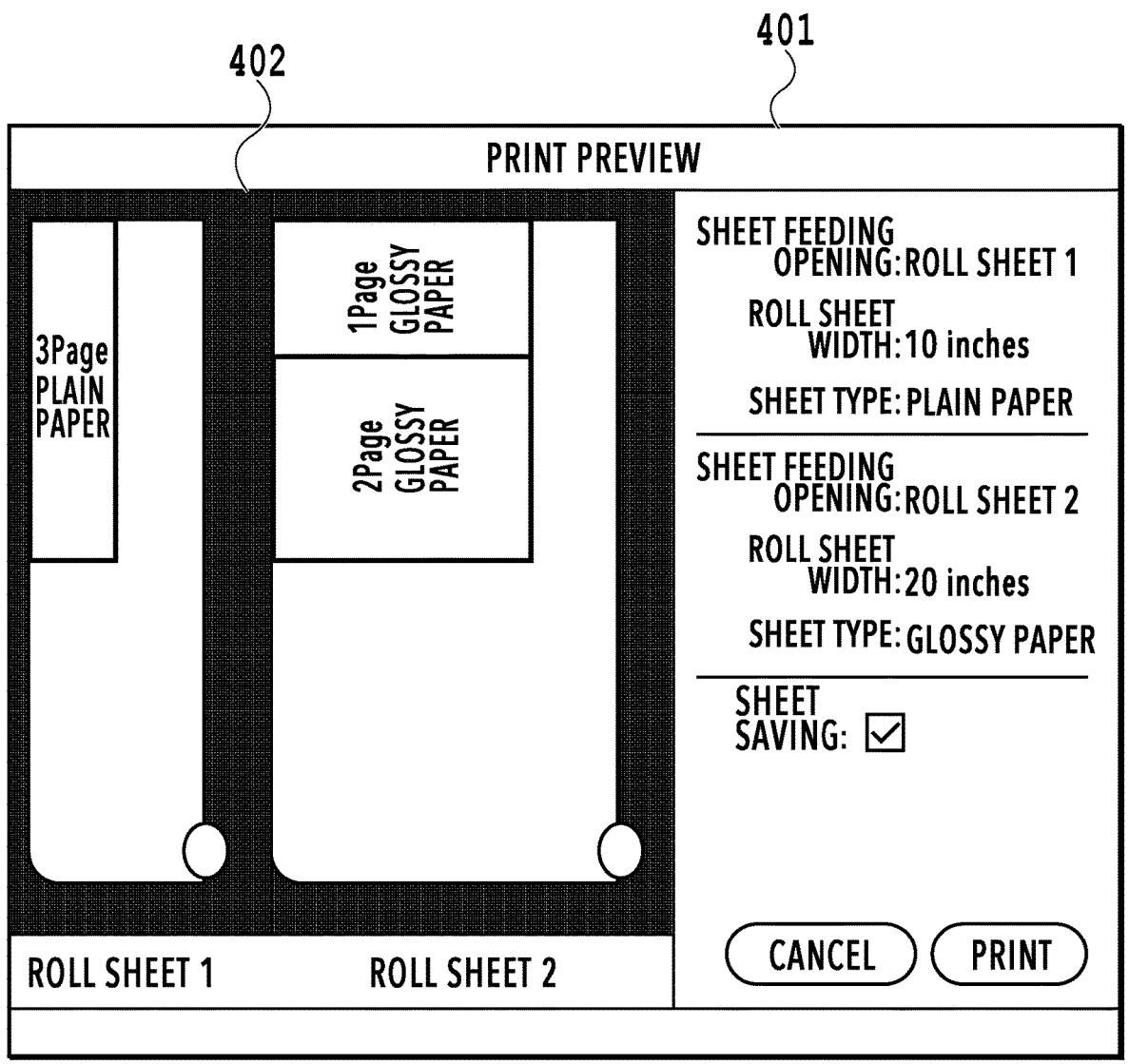
FIG. 13 shows an example of the print preview dialog in the second embodiment.

Applying the present embodiment can produce a further sheet-saving effect on the combination of the roll sheets 1 and 2 and the print job in the first embodiment described with reference to FIG. 5. FIG. 13 shows the print preview dialog in the case where the print preview control unit 106 executes print layout processing in accordance with the flowcharts of FIGS. 6, 12A and 12B for the combination of the roll sheets 1 and 2 and the print job described with reference to FIG. 5. The first and second pages are laid out in the landscape orientation on the roll sheet 2 and the third page is laid out in the portrait orientation on the roll sheet 1. In comparison with the result shown in FIG. 5, a margin in the width direction is small and a consumption in the height direction is reduced as to the roll sheet 2.

As described above, according to the present embodiment, a print preview for each page can be correctly displayed even in the case of executing layout processing while allowing rotation processing for each page in order to reduce the consumption of roll sheets. In short, a user can carry out print operation after confirming a layout in which the consumption of roll sheets is reduced.

OTHER EMBODIMENTS

The two embodiments described above are based on the premise that the printer driver is caused to "automatically select" the use of the roll sheet 1 or 2. However, the present embodiment is not limited to such a configuration. For instance, even in the case where a user designates the roll sheet 1 or 2 as a roll sheet for printing each page, it is beneficial to display correctly how a plurality of pages are laid out on each roll sheet before the execution of print operation.

Further, the types of print medium that can be placed in the printing apparatus are not limited to the two roll sheets 1 and 2. For example, the printing apparatus may be configured so that three or more roll sheets can be placed or so that a cassette storing a plurality of cut sheets can be placed in addition to the roll sheets.

Further, in the above description, the characteristic processing of the present invention is executed by the printer driver installed on the host apparatus. However, the characteristic processing may be executed by a control unit of the printing apparatus. In this case, for example, the document width and the type of print medium set for each page can be sent from the printer driver to the printing apparatus so that the control unit of the printing apparatus can execute the layout processing based on the types of print medium mounted on the printing apparatus and the information received from the printer driver. The result of the layout processing may be sent to the printer driver again and the print preview control unit may display the result based on the information. Alternatively, the control unit of the printing apparatus may directly display the result of the layout processing on the display unit of the printing apparatus. In any case, the present invention is effective as long as a print preview can be correctly displayed based on the information on the print medium mounted on the printing apparatus and the information about document sizes and print medium included in the print job.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-221023, filed Nov. 16, 2017, which is hereby incorporated by reference herein in its entirety.

What is claimed is:

1. A control method of a control apparatus, that can communicate with a printing apparatus equipped with a plurality of feeding units including a first feeding unit and a second feeding unit each of which is able to feed a continuous print medium having different widths from each other, the control method comprising:

acquiring print medium information about a print medium fed from each of the feeding units provided in the printing apparatus;

performing allocating processing that allocates, based on the acquired print medium information and setting information set for each of a plurality of pages included in a print job, each of the pages to a print medium fed from any one of the feeding units among the plurality of the feeding units; and displaying a preview in which an image representing a page allocated to a first print medium fed from the first feeding unit is laid out on an image representing the first print medium and a preview in which an image representing a page allocated to a second print medium being different from the first print medium and fed from the second feeding unit is laid out on an image representing the second print medium, wherein, in the allocating processing for a page in the print job, in a case where each of a width of the first print medium fed from the first feeding unit and a width of the second print medium fed from the second feeding unit is larger than a width of the page, the page is allocated to one of the first print medium and the second print medium which has a smaller width.

2. The control method according to claim 1, wherein each of the pages is allocated to any one of the print medium among the plurality of print medium based on information about a feeding unit designated by a user.

3. The control method according to claim 1, wherein each of the pages is allocated to any one of the print medium among the plurality of print medium based on the setting information set for each of the pages included in the print job and print medium size information and print medium type information included in the acquired print medium information.

4. The control method according to claim 3, wherein each of the pages is laid out on an image representing any one of the print medium among the plurality of print medium in such an orientation as to reduce a margin and a consumption in the print medium.

5. The control method according to claim 3, further comprising laying out a page allocated to the first print medium and a page allocated to the second print medium on the image representing the first print medium and the image representing the second print medium, respectively, wherein the layout of the pages is changed in accordance with the acquired print medium information.

6. The control method according to claim 1, wherein each of the feeding units has a sheet feeding opening for feeding a print medium, and each of the pages is allocated to any one of the print medium among the plurality of the print medium by allocating each of the pages to any one of the sheet feeding openings among the plurality of the sheet feeding openings.

7. The control method according to claim 1, wherein the preview of the page laid out on the image representing the first print medium and the preview of the page laid out on the image representing the second print medium are displayed on the same screen.

8. The control method according to claim 1, wherein the preview of the page laid out on the image representing the first print medium and the preview of the page laid out on the image representing the second print medium are displayed on screens switchable to each other.

9. The control method according to claim 7, wherein the preview of the page laid out on the image representing the first print medium and the preview of the page laid out on the image representing the second print medium are displayed at the same scale.

10. The control method according to claim 1, further comprising creating print data processible by the printing apparatus,
wherein the print data is generated so that a page allocated to one of the first print medium and the second print medium is continuously printed after pages allocated to the other of the first print medium and the second print medium are continuously printed.

11. A control apparatus that can communicate with a printing apparatus equipped with a plurality of feeding units including a first feeding unit and a second feeding unit each of which is able to feed a continuous print medium having different widths from each other, the control apparatus comprising one or more processors and one or more non-transitory computer-readable media operating as:
an acquisition unit configured to acquire print medium information about a print medium fed from each of the feeding units provided in the printing apparatus;
an allocation unit configured to perform allocating processing that allocate, based on the acquired print medium information and setting information set for each of a plurality of pages included in a print job, each of the pages to a print medium fed from any one of the feeding units;
a preview unit configured to display a preview in which an image representing a page allocated to a first print medium fed from the first feeding unit is laid out on an image representing the first print medium and a preview in which an image representing a page allocated to a second print medium being different from the first print medium and fed from the second feeding unit is laid out on an image representing the second print medium; and
a generation unit configured to generate, based on a result of the allocation, print data processible by the printing apparatus,
wherein, in the allocating processing for a page in the print job, in a case where each of a width of the first print medium fed from the first feeding unit and a width of the second print medium fed from the second feeding unit is larger than a width of the page, the allocation unit allocates the page to one of the first print medium and the second print medium which has a smaller width.

12. A print system including a printing apparatus and a control apparatus, the printing apparatus being equipped with a plurality of feeding units including a first feeding unit and a second feeding unit each of which is able to feed a continuous print medium having different widths from each other, the control apparatus being configured to communicate with the printing apparatus, the print system comprising one or more processors and one or more non-transitory computer-readable media operating as:
an acquisition unit configured to acquire print medium information about a print medium fed from each of the feeding units provided in the printing apparatus;
an allocation unit configured to perform allocating processing that allocate, based on the acquired print medium information and setting information set for each of a plurality of pages included in a print job, each of the pages to a print medium fed from any one of the feeding units among the plurality of the feeding units;
a preview unit configured to display a preview in which an image representing a page allocated to a first print medium fed from the first feeding unit is laid out on an image representing the first print medium and a preview in which an image representing a page allocated to a second print medium being different from the first print medium and fed from the second feeding unit is laid out on an image representing the second print medium;
a generation unit configured to generate print data based on a result of the allocation and in accordance with the print job; and
a printing unit configured to perform printing based on the print data,
wherein, in the allocating processing for a page in the print job, in a case where each of a width of the first print medium fed from the first feeding unit and a width of the second print medium fed from the second feeding unit is larger than a width of the page, the allocation unit allocates the page to one of the first print medium and the second print medium which has a smaller width.

13. The control method according to claim 1, wherein, in the preview, the widths of the images representing the first print medium and the second print medium are adjusted based on the print medium information.

14. The control method according to claim 1, wherein, in the preview, the widths of the images representing the first print medium and the second print medium are adjusted based on a ratio of widths of the first print medium and the second print medium indicated by the print medium information.

15. The control method according to claim 1, wherein in a case where the plurality of pages are allocated to the first print medium and the second print medium by the allocating, the preview in which the image representing the page allocated to the first print medium is laid out on the image representing the first print medium and the preview in which the image representing the page allocated to the second print medium is laid out on the image representing the second print medium is displayed.

* * * * *